(12) United States Patent
Meyer et al.

(10) Patent No.: US 7,442,727 B2
(45) Date of Patent: Oct. 28, 2008

(54) PYROGENICALLY PREPARED, SURFACE MODIFIED ALUMINUM OXIDE

(75) Inventors: Juergen Meyer, Stockstadt/Main (DE); Manfred Ettlinger, Karlstein (DE)

(73) Assignee: Degussa AG, Düsseldorf (DE)

( * ) Notice: Subject to any disclaimer, the term of this patent is extended or adjusted under 35 U.S.C. 154(b) by 0 days.

(21) Appl. No.: 10/455,504

(22) Filed: Jun. 4, 2003

(65) Prior Publication Data
US 2004/0249019 A1 Dec. 9, 2004

(51) Int. Cl.
*C08K 9/06* (2006.01)
*C08K 3/22* (2006.01)

(52) U.S. Cl. .......... 523/212; 524/430; 524/600; 428/405

(58) Field of Classification Search ........ 524/437, 524/430; 428/405; 523/200, 205, 212
See application file for complete search history.

(56) References Cited

U.S. PATENT DOCUMENTS

| | | | |
|---|---|---|---|
| 2,324,483 A | 7/1943 | Castan | |
| 2,444,333 A | 6/1948 | Castan | |
| 2,494,295 A | 1/1950 | Greenlee | |
| 2,500,600 A | 3/1950 | Bradley | |
| 2,511,913 A | 6/1950 | Greenlee | |
| 3,720,617 A * | 3/1973 | Chatterji et al. | 430/108.3 |
| 3,776,978 A | 12/1973 | Markovitz | |
| 3,812,214 A | 5/1974 | Markovitz | |
| 4,308,312 A | 12/1981 | Urban | |
| 4,760,296 A | 7/1988 | Johnston et al. | |
| 5,166,308 A | 11/1992 | Kreuz et al. | |
| 5,298,331 A | 3/1994 | Kanakarajan et al. | |
| 5,373,039 A * | 12/1994 | Sakai et al. | 524/100 |
| 5,384,194 A * | 1/1995 | Deusser et al. | 428/405 |
| 6,022,404 A * | 2/2000 | Ettlinger et al. | 106/404 |

FOREIGN PATENT DOCUMENTS

DE 199 43 291 3/2001

OTHER PUBLICATIONS

Hawley's Condensed Chemical Dictionary, 14th Edition, John Wiley & Sons, Inc., 2002.*

* cited by examiner

*Primary Examiner*—Vasu Jagannathan
*Assistant Examiner*—Vickey Ronesi
(74) *Attorney, Agent, or Firm*—Robert G. Weilacher; Smith, Gambrell & Russell

(57) ABSTRACT

Pyrogenically prepared, surface modified aluminum oxide, having the following physical chemical properties:

| | |
|---|---|
| Surface area [$m^2/g$] | 50 to 150 |
| Tamped density [g/L] | 25 to 130 |
| Drying loss [%] | less than 5 |
| Loss on ignition [%] | 0.1 to 15 |
| C content [%] | 0.1 to 15 |
| pH value | 3 to 9 | is prepared by treating pyrogenically prepared aluminum oxide with a surface modifying agent.

6 Claims, No Drawings

PYROGENICALLY PREPARED, SURFACE MODIFIED ALUMINUM OXIDE

INTRODUCTION AND BACKGROUND

The present invention relates to a pyrogenically prepared, surface modified aluminum oxide and a process for the preparation thereof as well as the use thereof.

Ceramic oxide particles, particularly silica, alumina, titania, and zirconia are known to have corona resistance properties. Sub-micron alumina is often used commercially in such (corona resistance) applications.

U.S. Pat. No. 4,308,312 to Urban teaches improved corona resistance using a film coating comprising alumina particles of a type "which provide a suspension which has an acid pH when the particles are slurried in distilled water."

U.S. Pat. No. 4,760,296 to Johnston et al. teaches the use of unmodified ceramic oxide particles, organosilicates, or organoaluminates as wire insulation (corona resistant) filler and distinguishes these composite fillers from organosiloxane derivatives.

Numerous temperature-resistant polymers, including polyimides, polyetherketones, polyethersulfones and polyphthalamides, have been considered for use as high voltage wire insulation. However, ceramic oxide fillers can be difficult, if not impractical or impossible, to efficiently and economically disperse into such polymers in sufficient quantities to achieve optimal desired corona resistance.

An ineffective dispersion of (corona resistant) composite filler can result in inadequate corona resistance and/or diminished mechanical properties. A need therefore exists for a temperature resistant polymeric composition (for wire coatings or similar type applications) having excellent corona resistance and/or mechanical properties.

It is known how to prepare pyrogenic aluminum oxide by means of high temperature or flame hydrolysis from $AlCl_3$ [Ullmann's Encyclopedia of Industrial Chemistry], 4th edition, Volume 21, page 464 (1982).

Pyrogenically prepared aluminum oxides are characterized by extremely fine particle size, high specific surface area (BET), very high purity, spherical particle shape, and the absence of pores. On account of these properties, pyrogenically prepared aluminum oxides are finding increasing interest as supports for catalysts (Dr. Koth et al., Chem. Ing. Techn. 52, 628 (1980).

It is known how to modify pyrogenically prepared aluminum oxide on its surface by means of a silane mixture (DE 42 02 694).

In accordance with the document DE 42 02 694, the modification is carried out by spraying aluminum oxide with 0.5 to 40 parts by weight of a silane mixture per 100 parts by weight of aluminum oxide, the silane mixture consisting of 1 to 99 parts by weight of a silane of Formula A

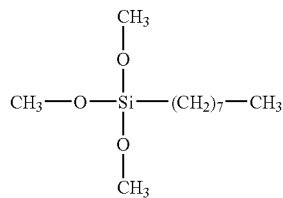

and 99 to 1 parts by weight of a silane of Formula B,

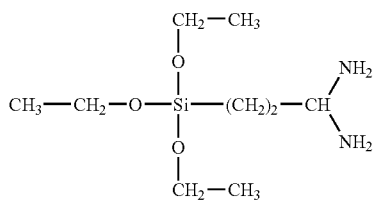

and the surface modified aluminum oxide having a surface area of 50 to 150 $m^2/g$, a tamped density of 50 to 90 g/L, a drying loss of less than 5%, a loss on ignition of 0.5 to 15%, a C content of 0.5 to 12% and a pH value of 4 to 8.

The object of the present invention is a pyrogenically prepared, surface modified aluminum oxide, which is characterized by:

| | |
|---|---|
| Surface area [$m^2/g$] | 50 to 150 |
| Tamped density [g/L] | 25 to 130 |
| Drying loss [%] | less than 5 |
| Loss on ignition [%] | 0.1 to 15 |
| C content [%] | 0.1 to 15 |
| pH value | 3 to 9 |

A further object of the invention is a process for the preparation of the pyrogenically prepared, surface modified aluminum oxide, which is characterized in that the pyrogenically prepared aluminum oxide is sprayed with a surface modifying agent, except for the mixture consisting of the silanes A and B in accordance with DE 42 02 694, at room temperature and the mixture is subsequently treated thermally at a temperature of 50 to 400° C. over a period of 1 to 6 h.

An alternative method for surface modification of the pyrogenically prepared aluminum oxide can be carried out by treating the pyrogenic aluminum oxide with a surface modifying agent, except for the mixture consisting of the silanes A and B in accordance with DE 42 02 694, in vapor form and subsequently treating the mixture thermally at a temperature of 50 to 800° C. over a period of 0.5 to 6 h.

The thermal treatment can be conducted under protective gas, such as, for example, nitrogen. The surface treatment can be carried out in heatable mixers and dryers with spraying devices, either continuously or batchwise. Suitable devices can be, for example, plowshare mixers or plate, cyclone, or fluidized bed dryers.

As starting material, it is possible to employ a pyrogenically prepared aluminum oxide, such as described in Ullmann's Encyclopedia of Industrial Chemistry, 4th edition, Volume 21, page 464 (1982).

Furthermore, it is possible to employ, as starting material, a high surface area, pyrogenically prepared aluminum oxide that has a specific BET surface area of more than 115 $m^2/g$.

This pyrogenically prepared aluminum oxide can be prepared in accordance with the flame oxidation method or, preferably, by flame hydrolysis, whereby, as starting material, a vaporized aluminum compound, preferably the chloride, is used. This aluminum oxide is described in DE 199 43 291.0-41 which is relied on and incorporated herein by reference.

As surface modifying agent, except for the mixture consisting of the silanes A and B in accordance with DE 42 02 694, it is possible to employ the following compounds and mixtures of the following compounds:

a) Organosilanes of the type $(RO)_3Si(C_nH_{2n+1})$ and $(RO)_3Si(C_nH_{2n-1})$, wherein
R=alkyl, such as, for example, methyl, ethyl, n-propyl, i-propyl, butyl, and
n=1-20 b) Organosilanes of the type $R'_x(RO)ySi(C_nH_{2n+1})$ and $R'_x(RO)_ySi(C_nH_{2n-1})$ wherein
R=alkyl, such as, for example, methyl-, ethyl-, n-propyl-, i-propyl-, butyl-
R'=alkyl, such as, for example, methyl, ethyl, n-propyl, i-propyl, butyl
R'=cycloalkyl
n=1-20
x+y=3
x=1,2, and
y=1,2 c) Halogen organosilanes of the type $X_3Si(C_nH_{2n+1})$ and $X_3Si(C_nH_{2n-1})$, wherein
X=Cl, Br
n=1-20 d) Halogen organosilanes of the type $X_2(R')Si(C_nH_{2n+1})$ and $X_2(R')Si(C_nH_{2n-1})$, wherein
X=Cl,Br
R'=alkyl, such as, for example, methyl, ethyl, n-propyl, i-propyl, butyl
R'=cycloalkyl
n=1-20 e) Halogen organosilanes of the type $X(R')_2Si(C_nH_{2n+1})$ and $X(R')_2Si(C_nH_{2n-1})$, wherein
X=Cl, Br
R'=alkyl, such as, for example, methyl, ethyl, n-propyl, i-propyl, butyl
R'=cycloalkyl
n=1-20 f) Organosilanes of the type $(RO)_3Si(CH_2)m$-R'
R=alkyl, such as methyl, ethyl, propyl
m=0.1-20
R'=methyl-, aryl (for example, $-C_6H_5$, substituted phenyl residues)
—$C_4F_9$, $OCF_2$—CHF—$CF_3$, —$C_6F_{13}$, —O—$CF_2$—$CHF_2$
—$NH_2$, —$N_3$, —SCN, —CH=$CH_2$, —NH—$CH_2$—$CH_2$—$NH_2$,
—N—($CH_2$—$CH_2$—$NH_2$)$_2$
—OOC($CH_3$)C=$CH_2$
—$OCH_2$—CH(O)$CH_2$
—NH—CO—N—CO—($CH_2$)$_5$
—NH—COO—$CH_3$, —NH—COO—$CH_2$—$CH_3$, —NH—($CH_2$)$_3$Si(OR)$_3$
—$S_x$—($CH_2$)$_3$Si(OR)$_3$
—SH
—NR'R"R'"(R'=alkyl, aryl; R"=H, alkyl, aryl; R'"=H, alkyl, aryl, benzyl, $C_2H_4$NR""R"" with R""=H, alkyl and R""'=H, alkyl)

g) Organosilanes of the type $(R'')_x(RO)_ySi(CH_2)_m$—R'
R"=alkyl x+y=2
=cycloalkyl x=1.2
y=1.2
m=0.1 to 20
R'=methyl, aryl (for example, —$C_6H_5$,substituted phenyl residues)
—$C_4F_9$, —$OCF_2$—CHF—$CF_3$, —$C_6F_{13}$, —O—$CF_2$—$CHF_2$
—$NH_2$, —$N_3$, —SCN, —CH=$CH_2$, —NH—$CH_2$—$CH_2$—$NH_2$,
—N—($CH_2$—$CH_2$—$NH_2$)$_2$
—OOC($CH_3$)C=$CH_2$
—$OCH_2$—CH(O)$CH_2$
—NH—CO—N—CO—($CH_2$)$_5$
—NH—COO—$CH_3$, —NH—COO—$CH_2$—$CH_3$,
—NH—($CH_2$)$_3$Si(OR)$_3$
—$S_x$—($CH_2$)$_3$Si(OR)$_3$
—SH—NR'R"R'"(R'=alkyl, aryl; R"=H, alkyl, aryl; R'"=H, alkyl, aryl, benzyl, $C_2H_4$NR""R"" with R""=H, alkyl and R""'=H, alkyl)

h) Halogen organosilanes of the type $X_3Si(CH_2)m$-R'
X=Cl, Br
m=0.1-20
R'=methyl-, aryl (for example, —$C_6H_5$, substituted phenyl residues)
—$C_4F_9$, —$OCF_2$—CHF—$CF_3$, —$C_6F_{13}$, —O—$CF_2$—$CHF_2$
—$NH_2$, —$N_3$, —SCN, —CH=$CH_2$,
—NH—$CH_2$—$CH_2$—$NH_2$
—N—($CH_2$—$CH_2$—$NH_2$)$_2$
—OOC($CH_3$)C=$CH_2$
—$OCH_2$—CH(O)$CH_2$
—NH—CO—N—CO—($CH_2$)$_5$
—NH—COO—$CH_3$, —NH—COO—$CH_2$—$CH_3$,
—NH—($CH_2$)$_3$Si(OR)$_3$
—$S_x$—($CH_2$)$_3$Si(OR)$_3$
—SH i) Halogen organosilanes of the type $(R)X_2Si(CH_2)m$-R'
X=Cl,Br
R=alkyl, such as methyl, ethyl, propyl
m=0.1-20
R'=methyl-, aryl (for example, —$C_6H_5$, substituted phenyl residues)
—$C_4F_9$, —$OCF_2$—CHF—$CF_3$, —$C_6F_{13}$, —O—$CF_2$—$CHF_2$
—$NH_2$, —$N_3$, —SCN, —CH=$CH_2$, —NH—$CH_2$—$CH_2$—$NH_2$,
—N—($CH_2$—$CH_2$—$NH_2$)$_2$
—OOC($CH_3$)C=$CH_2$
—$OCH_2$—CH(O)$CH_2$
—NH—CO—N—CO—($CH_2$)$_5$
—NH—COO—$CH_3$, —NH—COO—$CH_2$—$CH_3$,
—NH—($CH_2$)$_3$Si(OR)$_3$,
wherein R=methyl, ethyl, propyl, butyl
—$S_x$—($CH_2$)$_3$Si(OR)$_3$, wherein R=methyl, ethyl, propyl, butyl
—SH j) Halogen organosilanes of the type $(R)_2X Si(CH_2)m$-R'
X=Cl, Br
R=alkyl
m=0.1-20
R'=methyl-, aryl (for example, —$C_6H_5$, substituted phenyl residues)

—$C_4F_9$, —$OCF_2$—CHF—$CF_3$, —$C_6FI_3$, —O—$CF_2$—$CHF_2$
—$NH_2$, —$N_3$, —SCN, —CH=$CH_2$, —NH—$CH_2$—$CH_2$—$NH_2$,
—N—($CH_2$—$CH_2$—$NH_2$)$_2$
—$OOC(CH_3)C$=$CH_2$
—$OCH_2$—CH(O)$CH_2$
—NH—CO—N—CO—($CH_2$)$_5$
—NH—COO—$CH_3$, —NH—COO—$CH_2$—$CH_3$, —NH—($CH_2$)$_3$Si(OR)$_3$
—$S_x$—($CH_2$)$_3$Si(OR)$_3$
—SH k) Silazanes of the type

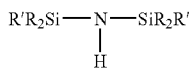

R=alkyl
R"=alkyl, vinyl l) Cyclic polysiloxanes of the type D 3, D 4, D 5, wherein D 3, D 4 and D 5 refer to cyclic polysiloxanes with 3, 4, or 5 units of the type —O—Si($CH_3$)2-.
For example, octamethylcyclotetrasiloxane=D 4

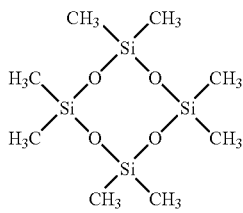

m) Polysiloxanes or silicone oils of the type

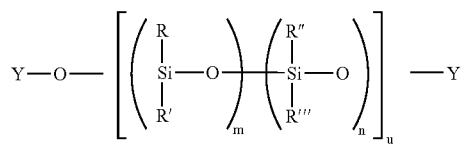

m=0, 1, 2, 3, ... ∞
n=0, 1, 2, 3, ... ∞
u=0, 1, 2, 3, ... ∞
Y=$CH_3$, H, $C_nH_{2n+1}$
n=1–20
Y=Si ($CH_3$)$_3$, Si ($CH_3$)$_2$H, Si ($CH_3$)$_2$OH, Si ($CH_3$)$_2$( Si($CH_3$) $_2$ ($C_nH_{2n+1}$), n=1–20

R=alkyl, such as $C_nH_{2n+1}$, where n=1 to 20, aryl, such as phenyl and substituted phenyl residues, ($CH_2$)n-$NH_2$, H R'=alkyl, such as $C_nH_{2n+1}$, where n=1 to 20, aryl, such as phenyl and substituted phenyl residues, ($CH_2$)n-$NH_2$, H R"=alkyl, such as $C_nH_{2n+1}$, where n=1 to 20, aryl, such as phenyl and substituted phenyl residues, ($CH_2$)n-$NH_2$, H R'"=alkyl, such as $C_nH_{2n+1}$, where n=1 to 20, aryl, such as phenyl and substituted phenyl residues, ($CH_2$)n-$NH_2$, H Preferably, as surface modifying agent, the following silanes are employed, either individually or in a mixture:

dimethyldichlorosilane, octyltrimethoxysilane, oxtyltriethoxysilane, hexamethyldisilazane, 3-methacryloxypropyltrimethoxysilane, 3-methacryloxypropyltriethoxysilane, hexadecyltrimethoxysilane, hexadecyltriethoxysilane, dimethylpolysiloxane, glycidyloxypropyltrimethoxysilane, glycidyloxypropyltriethoxysilane, nanofluorohexyltrimethoxysilane, tridecafluorooctyltrimethoxysilane, tridecafluorooctyltriethoxysilane, aminopropyltriethoxysilane.

Especially preferably, octyltrimethoxysilane and octyltriethoxysilane can be employed.

Excluded are the silanes that are employed in DE 42 02 094 in the form of a mixture.

The pyrogenically prepared, surface modified aluminum oxide in accordance with the invention can be employed as additives in high temperature polymers.

The surface modified alumina according to this invention can be used in high temperature polymeric materials useful for wire wrap type applications, including polymeric materials comprising at least 50 weight percent high temperature polymers, such as, polyimide, polyetherketone, polyethersulfone polyphthalamide and/or combinations or derivatives.

The high temperature polymeric materials comprise corona resistant composite filler, which is the alumina according to the invention, in an amount within a range between (and including) any two of the following weight percentages: 2 and 50 weight percent.

The organic component is selected according to the particular solvent system selected for dispersing the composite filler into the high temperature polymeric material (or precursor thereto). In one or more steps, the high temperature polymeric material (or precursor thereto) is solvated to a sufficiently low viscosity to allow the composite filler (also suspendable in the solvent system concurrently or in a subsequent step or steps) to be dispersed within the polymer or polymer precursor without undue agglomeration, interfacial voids or other problems that have often been associated with inorganic particle composite fillers dispersed in high temperature polymeric materials. The resulting filled polymeric material has been found to have extraordinary corona resistance, without unduly harming (and in some instances actually improving) mechanical properties.

The corona resistant high temperature polymeric materials can be suitable for wire insulation in high voltage applications. For example, wire insulated with the corona resistant compositions can be used in combination with (or as an integral part of) rotors, stators or the like found in large industrial dynamo-electric machinery or the like.

The compositions comprise: i.a. high temperature polymeric matrix and ii. a composite, corona resistant composite filler. These components will be described individually, then in combination.

High Temperature Polymeric Matrix. Useful high temperature polymeric matrices of the present invention include as a dominant component a polymer having one or more of the following moieties: amide, imide, ether, sulfone, epoxy, carbonate, ester. Preferred high temperature polymeric matrix polymers include:

1. polyimide,
2. polyester,
3. polyesteramide,
4. polyesteramideimide,
5. polyamide,
6. polyamideimide,
7. polyetherimide,
8. polycarbonate,
9. polysulfone,
10. polyether,
11. polyetherketone,
12. polyethersulfone,
13. polyphthalamide,
14. epoxy resins,
15. and the like, including derivations and combinations thereof.

In one embodiment, the polymeric matrix is a thermoset polyimide, such as a KAPTON® brand polyimide available from E.I. du Pont de Nemours and Company of Wilmington, Del., USA. As used herein, the term 'thermoplastic' polyimide is intended to mean a polyimide composition where the glass transition temperature of the material is less than 375, 350, 325 or 300° C. Conversely 'thermoset' polyimides are intended to include polyimide compositions where the glass transition temperature is equal to or greater than the above defined (upper limit) glass transition of a thermoplastic polyimide, or otherwise where the polyimide does not have a measurable glass transition temperature.

The polymeric binder is a polyimide synthesized by first forming a polyimide precursor (a polyamic acid solution) created by reacting (in a solvent system) one or more dianhydride monomers with one or more diamine monomers. So long as the corona resistant composite filler is sufficiently dispersible in the polyamic acid solution, the composite filler can be dispersed prior to, during, or after the polyamic acid solution is created, at least until polymerization, imidization, solvent removal or other subsequent processing increases viscosity beyond what is needed to disperse the composite filler within the material. Ultimately the precursor (polyamic acid) is converted into a high temperature polyimide material having a solids content of greater than 99.5 weight percent, and at some point in this process, the viscosity is increased beyond what is necessary to intermix the composite filler into the polyimide or polyimide precursor. Depending upon the particular embodiment chosen, the viscosity could possibly be lowered again by solvating the material, perhaps sufficient to allow dispersion of the composite filler into the material.

In one embodiment, the polyamic acid solution is formed from one or more aromatic and/or aliphatic diamine monomers and one or more aromatic and/or aliphatic dianhydride monomers. In an alternate embodiment the dianhydride and diamine monomers are both aromatic, optionally also including an aliphatic diamine.

Polyamic acid solutions can be converted to high temperature polyimides using processes and techniques commonly known in the art, such as heat and/or conventional polyimide conversion chemistry. Such polyimide manufacturing processes have been practiced for decades, and the amount of public literature on polyimide manufacture is legion, and hence further discussion here is unnecessary. Any conventional or non-conventional polyimide manufacturing processes are appropriate for use in accordance with the present invention, provided a precursor material is available of sufficiently low viscosity to allow composite filler particles of the present invention to be mixed therein.

As used herein, an "aromatic" monomer is either a diamine or a dianhydride having at least one aromatic ring, either alone (i.e., a substituted or unsubstituted, functionalized or unfunctionalized benzene or similar-type aromatic ring) or connected to another (aromatic or aliphatic) ring.

The term "diamine monomer" as used herein is intended to mean a monomer that reacts with (is complimentary to) a dianhydride monomer to form an intermediate polyamic acid. The polyamic acid is then cured, typically under heat, to form a polyimide.

Depending upon the context, the term "diamine monomer" can mean (i.) an unreacted monomer (i.e., a diamine monomer); (ii.) a partially reacted monomer (i.e., an oligomer or other polyimide precursor having amine functionality, whereby the precursor is derived in part from diamine monomer) or (iii.) a diamine portion of a fully reacted polymer (the portion or portions of the polyimide attributable to the diamine monomer). The diamine monomer can be functionalized with one or more moieties, depending upon the particular embodiment selected in the practice of the present invention.

Indeed, the term "diamine" is not intended to be limiting (or interpreted literally) as to the number of amine moieties in the diamine monomer. For example, (ii.) and (iii.) above include polymeric materials that may have two, one, or zero amine moieties. Alternatively, the diamine monomer may be functionalized with additional amine moieties (in addition to the amine moieties that react with a dianhydride to provide a polyimide chain). Such additional amine moieties could be used to crosslink the polymer or to provide other functionality to the polymer.

Similarly, the term 'dianhydride monomer' as used herein is intended to mean the monomer that reacts with (is complimentary to) the diamine monomer to form a polyamic acid, and then upon curing with heat and/or radiation, a polyimide.

Depending upon the context in which it is used, "anhydride" as used herein can mean not only an anhydride moiety per se, but also a precursor to an anhydride moiety, such as: (i.) a pair of carboxylic acid groups (which can be converted to anhydride by a dehydration or similar-type reaction); or (ii.) an acid-acid ester functionality (or any other functionality presently known or developed in the future which is) capable of conversion to anhydride functionality.

Depending upon, context, "dianhydride" can mean: (i) the unreacted form (i.e., a dianhydride monomer, whether the anhydride functionality is in a true anhydride form or a precursor anhydride form, as discussed in the prior above paragraph); (ii) a partially reacted form (i.e., the portion or portions of an oligomer or other partially reacted or precursor polyimide composition reacted from or otherwise attributable to dianhydride monomer) or (iii) a fully reacted form (the portion or portions of the polyimide derived from or otherwise attributable to dianhydride monomer).

The dianhydride monomer can be functionalized with one or more moieties, depending upon the particular embodiment selected in the practice of the present invention. Indeed, the term "dianhydride" is not intended to be limiting (or interpreted literally) as to the number of anhydride moieties in the dianhydride monomer. For example, (i.), (ii.) and (iii.) (in the paragraph above) include organic substances that may have one or zero anhydride moieties, depending upon whether the anhydride is in a precursor state or a reacted state. Alternatively, the dianhydride monomer may be functionalized with additional anhydride type moieties (in addition to the anhydride moieties that react with diamine to provide a polyimide). Such additional anhydride moieties could be used to crosslink the polymer or to provide other functionality to the polymer.

Examples of useful dianhydride monomers in the present invention include pyromellitic dianhydride (PMDA);

3,3',4,4'-biphenyl tetracarboxylic dianhydride (BPDA);

3,3',4,4'-benzophenone tetracarboxylic dianhydride (BTDA);

4,4'-oxydiphthalic dianhydride (ODPA); bis(3,4-dicarboxyphenyl) sulfoxide dianhydride (DSDA);

1,1,1,3,3,3,-hexafluoropropane dianhydride (6FDA); bisphenol A dianhydride (BPADA); 2,3,6,7-naphthalene tetracarboxylic dianhydride; 1,2,5,6-naphthalene tetracarboxylic dianhydride; 1,4,5,8-naphthalene tetracarboxylic dianhydride; 2,6-dichloronaphthalene-1,4,5,8-tetracarboxylic dianhydride; 2,7-dichloronaphthalene-1,4,5,8-tetracarboxylic dianhydride; 2,2'-bis(trifluoromethylbenzidine); 2,3,3',4'-biphenyl tetracarboxylic dianhydride; 2,2',3,3'-biphenyl tetracarboxylic dianhydride; 2,3,3',4'-benzophenone tetracarboxylic dianhydride; 2,2',3,3'-benzophenone tetracarboxylic dianhydride; 2,2-bis(3,4-dicarboxyphenyl) propane dianhydride; 1,1-bis(2,3-dicarboxyphenyl)ethane dianhydride; 1,1-bis(3,4-dicarboxyphenyl)ethane dianhydride; bis(2,3-dicarboxyphenyl)methane dianhydride; bis(3,4-dicarboxyphenyl) methane dianhydride; 4,4'-(hexafluoroisopropylidene) diphthalic anhydride; bis(3,4-dicarboxyphenyl) sulfone dianhydride; tetrahydrofuran-2,3,4,5-tetracarboxylic dianhydride; pyrazine-2,3,5,6-tetracarboxylic dianhydride; thiophene-2,3,4,5-tetracarboxylic dianhydride; phenanthrene-1,8,9,10-tetracarboxylic dianhydride; perylene-3,4,9,10-tetracarboxylic dianhydride; bis-1,3-isobenzofurandione; bis(3,4-dicarboxyphenyl) thioether dianhydride; bicyclo-[2,2,2]-octen-(7)-2,3,5,6-tetracarboxylic-2,3,5,6-dianhydride; 2-(3',4'-dicarboxyphenyl) 5,6-dicarboxybenzimidazole dianhydride; 2-3',4'-dicarboxyphenyl) 5,6-dicarboxybenzoxazole dianhydride; 2-(3',4'-dicarboxyphenyl) 5,6-dicarboxybenzothiazole dianhydride; bis(3,4-dicarboxyphenyl) 2,5-oxadiazole 1,3,4-dianhydride; b is 2,5-(3',4'-dicarboxydiphenylether) 1,3,4-oxadiazole dianhydride; their acid ester and their acid chloride derivatives.

Pyromellitic dianhydride (PMDA) is preferred.

Examples of suitable diamine monomers include: 2,2 to-(4-aminophenyl) propane; 4,4'-diaminodiphenyl methane; 4,4'-diaminodiphenyl sulfide; 3,3'-diaminodiphenyl sulfone; 4,4'-diaminodiphenyl sulfone; 4,4'-diaminodiphenyl ether (4,4'-ODA); 3,4'-diaminodiphenyl ether (3,4-ODA); 1,3-bis-(4-aminophenoxy)benzene (APB-134); 1,3-bis-(3-aminophenoxy)benzene (APB-133); 1,2-bis-(4-aminophenoxy)benzene; 1,2-bis-(3-aminophenoxy)benzene; 1,4-bis-(4-aminophenoxy)benzene; 1,4-bis-(3-aminophenoxy)benzene; 1,5-diaminonaphthalene; 4,4'-diaminodiphenyldiethylsilane; 4,4'-diaminodiphenylsilane; 4,4'-diaminodiphenylethylphosphine oxide; 4,4'-diaminodiphenyl-N-methyl amine; 4,4'-diaminodiphenyl-N-phenyl amine; 1,2-diaminobenzene (OPD); 1,3-diaminobenzene (MPD); 1,4-diaminobenzene (PPD); 2,5-dimethyl-1,4-diaminobenzene; 2,5-dimethyl-1,4-phenylenediamine (DPX); trifluoromethyl-2,4-diaminobenzene; trifluoromethyl-3,5-diaminobenzene; 2,2-bis(4-aminophenyl) 1,1,1,3,3,3-hexafluoropropane; 2,2-bis(3-aminophenyl) 1,1,1,3,3,3-hexafluoropropane; benzidine; 4,4'-diaminobenzophenone; 3,4'-diaminobenzophenone; 3,3'-diaminobenzophenone; m-xylylene diamine; p-xylylene diamine; bisaminophenoxyphenylsulfone; 4,4'-isopropylidenedianiline; N,N-bis-(4-aminophenyl)methylamine; N,N-bis-(4-aminophenyl) aniline; 3,3'-dimethyl-4,4'-diaminobiphenyl; 4-aminophenyl-3-aminobenzoate; 2,4-diaminotoluene; 2,5-diaminotoluene; 2,6-diaminotoluene; 2,4-diamine-5-chlorotoluene; 2,4-diamine-6-chlorotoluene; 2,4-bis-(beta-amino-t-butyl) toluene; bis-(p-beta-amino-t-butyl phenyl)ether; p-bis-2-(2-methyl-4-aminopentyl)benzene; 1-(4-aminophenoxy)-3-(3-aminophenoxy)benzene; 1-(4-aminophenoxy)-4-(3-aminophenoxy)benzene; 2,2-bis-[4-(4-aminophenoxy)phenyl]propane (BAPP); 2,2'-bis-(4-aminophenyl)-hexafluoro propane (6F diamine); 2,2'-bis-(4-phenoxy aniline) isopylidene; 2,4,6-trimethyl-1,3-diaminobenzene; 4,4'-diamino-2,2'-trifluoromethyl diphenyloxide; 3,3'-diamino-5,5'-trifluoromethyl diphenyloxide; 2,2'-trifluoromethyl-4,4'-diaminobiphenyl; 4,4'-oxy-bis-[(2-trifluoromethyl)benzene armine]; 4,4'-oxy-bis-[(3-trifluoromethyl)benzene amine]; 4,4'-thio-bis-[(2-trifluoromethyl)benzene-amine]; 4,4'-thio-bis-[(3-trifluoromethyl)benzene amine]; 4,4'-sulfoxyl-bis-[(2-trifluoromethyl)benzene amine; 4,4'-sulfoxyl-bis-[(3-trifluoromethyl)benzene amine];

and 4,4'-keto-bis-[(2-trifluoromethyl)benzene amine]. 4,4'-oxydianiline (4,4-ODA) is preferred.

Aliphatic diamines are also useful diamine monomers and are used to make the polyamic acid precursors (and then the polyimides) of the present invention. Useful aliphatic diamines are 1,4-tetramethylenediamine, 1,5-pentamethylenediamine (PMD), 1,6-hexamethylenediamine (HMD), 1,7-heptamethylene diamine, 1,8-octamethylenediamine, 1,9-nonamethylenediamine, 1,10-decamethylenediamine (DMD), 1,11-undecamethylenediamine, 1,12-dodecamethylenediamine (DDD), 1,16-hexadecamethylenediamine. The preferred aliphatic diamine is 1,6-hexamethylene diamine (HMD). 1,6-hexamethylene diamine (HMD) is preferred.

In an alternative embodiment, an epoxy resin is used as the high temperature polymer matrix. In one embodiment, the epoxy resin is derived from bisphenol-A diglycidyl ether, epoxy novolac resins, cycloaliphatic epoxy resins, diglycidyl ester resins, glycidyl ethers of polyphenols or the like. These resins preferably have an epoxy equivalent weight average molecular weight of about 130-1500. Such resins are well known in the art and are described in U.S. Pat. Nos. 2,324,483; 2,444,333; 2,494,295; 2,500,600; and 2,511,913.

Catalytic hardeners, or curing agents for the above mentioned epoxy resins include aluminum acetylacetonate, aluminum di-sec-butoxide acetoacetic ester chelate or tetraoctylene glycol titanate in combination with phenolic accelerators, including resorcinol, catechol or hydroquinone and the corresponding dihydroxynaphthalene compounds. Compositions of this type have been described in U.S. Pat. Nos. 3,776,978 and 3,812,214.

The organic component of the composite filler material is chosen primarily to provide or improve dispensability of the composite filler material into a particular solvated polymer matrix or polymer matrix precursor. Generally speaking, an organic component of similar polarity (to a selected solvent) and of relatively low molecular weight will more readily disperse in the solvent than otherwise. Hence the organic component is selected in view of the particular solvent system into which the composite filler is intended to be dispersed or otherwise intermixed.

Similarly, the inorganic component of the composite filler is selected primarily to provide or improve corona resistance. Since alumina is a widely accepted corona resistant inorganic ceramic oxide, it is particularly mentioned herein, but the industry may prefer or otherwise adopt other types of corona resistant inorganic ceramic oxides, and hence the inorganic component is intended to be broadly defined.

While not intending to be bound by a particular theory, in at least one embodiment it is believed that the organic component lowers the surface energy of the inorganic component and thus allows it to be easily dispersible in organic solvents. Because the composite fillers of the present invention are more readily dispersible, often with little to no additional shearing force or filtration required, these slurries often form fewer, perhaps no (or essentially no, i.e., less than 100 per million (or "ppm"), highly undesired agglomerates in the size range of greater than 0.5 microns. Hence, the compositions of the present invention can be used to form films having highly improved dielectric strength and/or highly improved mechanical film properties.

Furthermore in some embodiments, it has been surprisingly discovered that films often have higher dielectric strength than films made without inorganic ceramic oxide particles incorporated into the polymer (i.e., pure polyimide polymer without metal oxide or silica filler). Although not intending to be bound to any particular theory, it is theorized that the composite fillers provide such an efficient dispersion of non-agglomerated small particles within the polymer matrix that the composite fillers of the present invention may be capable of diluting electric charge along a film's x-y plane, at least to a greater extent than is observed with unfilled, pure polymer (and also to a greater extent than conventional poorly dispersed, more highly aggregated ceramic oxide fillers), perhaps thereby improving electrical resistance in the z direction.

Typically, the composite fillers of the present invention generally do not require extensive milling and filtration to breakup unwanted particle agglomeration as is typical when attempting to disperse nano-sized conventional ceramic oxide fillers into a polymer matrix. Such milling and filtration can be costly and may not be capable of removing all unwanted agglomerates.

Indeed in one embodiment, the composite filler is dispersible and suspendible at 20 weight percent in a (at least 99 weight percent pure) dimethylacetamide solvent and after dispersing and suspending the filler into the solvent with a high shear mechanical force, less than 15, 10, 8, 6, 4, 2 or 1 weight percent of the filler precipitates out of solution when kept at rest at 20° C. for 72 hours.

Composite, Corona Resistant Filler: Organic Component. The organic component of the corona resistant composite filler of the present invention can be polymerization (by conventional or non-conventional techniques) using virtually any monomer, depending upon the embodiment selected. The organic component is often, at least in part, the organic portion of a (organic-inorganic) coupling agent reacted to the inorganic component. In selecting the organic component, proper attention should be given to matching the dispensability of the organic component with the particular solvent chosen for the particular high temperature polymer matrix selected.

Generally speaking, the organic component is more readily dispersible in a solvent, the more similar the polarity (or non-polarity) of the organic component with respect to the solvent; furthermore, the lower the molecular weight, generally speaking, the greater the dispensability of the organic component. Hence, the organic component should be selected in a way that optimizes the polarity of the composite filler with the polarity of the solvent, while also minimizing the surplus amount of organic component (that does little to further compatibalize polarity while thereby unduly adding bulk that is detrimental to dispensability). Ordinary skill and experimentation may be necessary in optimizing the organic component for any particular solvent system selected.

Potentially useful monomers include:
1. unsaturated aromatic compounds such as styrene, alpha-methylstyrene, halogenated styrene and divinylbenzene;
2. unsaturated esters such as vinyl acetate and vinyl propionate;
3. unsaturated nitriles, such as, acrylonitrile;
4. acrylic acid esters or methacrylic acid esters, such as methyl acrylate, methyl ethacrylate, ethyl acrylate, ethyl methacrylate, 2-ethylhexyl acrylate, 2-ethylhexyl methacrylate, lauryl acrylate, lauryl methacrylate, ethyleneglycol diacrylate, ethyleneglycol dimethacrylate, glycidyl acrylate, glycidyl methacrylate, 2-hydroxyethyl acrylate, acryl acrylate and allyl methacrylate;
5. $C_2$-$C_{20}$ alkene or vinyl monomers, such as ethylene, propylene, butylene, butadiene, isoprene, and the like;
6. acrylic acid, methacrylic acid, and derivations thereof;
7. acrylamide, methacrylamide, N-methylolacrylamide, N-methylolmethacrylamide, and the like;
8. monomers having one or more polymerizable reactive sites, such as, hydroxyl, epoxy, carboxyl, anhydride, amino, halide, and the like; and
9. combinations and derivations thereof.

However, the organic component must be functionalized or otherwise capable of being bonded to the inorganic ceramic oxide component of the composite filler by means of an organo-siloxane (and less preferably, an organo-metaloxane) moiety. This can be done by functionalizing the organic component with a functional group capable of reacting with the inorganic ceramic oxide component in a way that produces a siloxane (or metaloxane) linkage between the two components.

For example, the organic component can be functionalized with a —Si($R_1$, $R_2$, $R_3$), where: —Si—$R_1$,
—$S_1$—$R_2$, and
—$S_1$—$R_3$
are the same or different and at least one of which is further defined as being —SiOR, where R is either:
1. hydrogen (i.e., —SiOR is —SiOH); or
2. a substituted or unsubstituted alkyl capable of undergoing hydrolysis to convert the —OR to —OH, (i.e., SiOR is a precursor to —SiOH, that is converted to SiOH upon hydrolysis).

In this embodiment, the —SiOH functionalized organic component can be reacted to the inorganic component, bonding the organic and inorganic components together and thereby forming a —Si—O—X— bond at the interface of the two components, where X is an atom of the inorganic component that is either Si or a metal, depending upon the particular inorganic component selected.

The forming of an organo-siloxane (or organo-metaloxane) bond at the interface of the two composite filler components can also be done by functionalizing the inorganic component with an R'—Si—O—X moiety (or R'—M—O—X— moiety), where X is an atom of (and covalently bonded with and to) the inorganic component and is either Si or a metal, depending upon the particular inorganic component selected, and where R' is an organic moiety that is either the entire organic component or a portion of the organic component that is then reacted with one or more additional organic reactants to form the organic component.

In one embodiment, the organosiloxane bond between the organic and inorganic components of the composite filler can be accomplished by using an organo-silane coupling agent, where the silane group of the coupling agent bonds (forming a siloxane linkage) to the inorganic component and the organo portion of the coupling agent is selected to bond to the organic component. Useful such coupling agents may include:

(a) vinyltrichlorsilane, vinyltris(.beta.-methoxyethoxy)silane, vinyltriethoxysilane, vinyltrimethoxysilane, gamma-methacryloxypropyltrimethoxysilane, gamma-mercaptopropyltrimethoxysilane and gamma-chloropropyltrimethoxysilane;

(b) gamma-glycidoxypropyltrimethoxysilane and gamma-glycidoxypropylmethyldiethoxysilane; and (c) N-beta(aminoethyl).gamma.-aminopropylttimethoxysilane, N-(beta(aminoethyl) gamma-aminopropylmethyldimethoxysilane and gamma-aminopropyltriethoxysilane.

The silane coupling agents of the present invention preferably have functional groups that can easily react with the organic component functional groups. For example, for organic components having carboxyl groups introduced therein, the silane coupling agents of (b) and (c) above with epoxy groups and amino groups are preferred. Among these, gamma-glycidoxypropyltrimethoxysilane and N-(beta-(aminoethyl) gamma-aminopropyltrimethoxysilane are particularly preferred.

A less preferred by alternative coupling agents include organo-metaloxane coupling agents, such as, acetoalkoxyaluminum diisopropylate and the like, and isopropyl triisostearoyltitanate, isopropyltridecyl benzenesulfonyltitanate, and the like. Different coupling agents may be used alone or in combinations of two or more, and coupling agents of different types may also be used together.

In one embodiment, the organo portion of the coupling agent is all or part of the organic component of the composite filler. If a commercial or otherwise available coupling agent can be found having a suitable organo portion offering excellent dispensability with respect to a particular, desired solvent system, the organic component of the composite filler is generally preferably obtained by means of the coupling agent. In such circumstances (or otherwise) a sophisticated inorganic particle supplier, such as Degussa AG of Germany, may be able to custom manufacture a suitable inorganic/organic composite filler (bonded with an organo-siloxane or organo-metaloxane) in accordance with the present invention.

Otherwise, the bonding of each coupling agent to a separate organic component can be accomplished by dispersing the coupling agent in a dispersion containing the organic component and the inorganic component. Depending upon the particular embodiment of the present invention chosen, suitable solvent systems can include water, organic solvents and water in combination with (water miscible) organic solvents, such as many alcohols. Incompatible (or multi-phase) solvent systems may also be useful, depending upon the particular embodiment selected, provided sufficient agitation or mixing is provided to allow reaction between the coupling agent and both the organic and inorganic component of the composite filler. When water is included in the dispersion medium, it is preferred to introduce hydrophilic functional groups such as hydroxyl groups, epoxy groups or carboxylic groups into the organic component in order to stabilize the organic component in the dispersion system and achieve uniform dispersion. Introduction of these functional groups can also promote easier chemical bonding and/or non-chemical bonding of the coupling agent(s). Preferred alcohols for such use include lower saturated aliphatic alcohols such as methanol, ethanol, 1-propanol, 2-propanol, 1-butanol, 2-butanol, tert-butanol and the like. These alcohols can be used alone or in combinations of two or more. Other organic solvents besides alcohol, such as methyl ethyl ketone and dimethylformamide may be used, and these organic solvents, water and alcohol may also be used in combination in appropriate weight ratios.

In the above described reaction to create the composite filler, the organic component content in the dispersion medium is preferably 0.0001-70 wt % (hereunder all percent values will mean weight percent, unless indicated otherwise), more preferably 0.001-50%, and especially 0.01-25%. If the content is under 0.0001%, the composite filler yield can be low, and if it is over 70%, one or more components may fall out of suspension or otherwise dispersion stability can be problematic. Further, the reaction for forming the composite filler can be promoted by heating or using a catalyst. For heating, the reaction system temperature is preferably 40-100° C. As catalysts there may be used acids, bases, aluminum compounds, tin compounds and the like. Acid catalysts and aluminum catalysts are well known for promoting organo-siloxane or organo-metaloxane reactions with inorganic oxide particles.

Incorporating the Composite Filler Into A High Temperature Polyimide Matrix. Polar aprotic solvents are particularly useful in forming polyimides. Hence, the composite fillers of the present invention are preferably designed to readily disperse in polar aprotic solvents, such as, N-methylpyrrolidinone (NMP), dimethylacetamide (DMAc), gamma-butyrolactone, N,N'-dimethyl-formamide (DMF), dimethyl sulfoxide (DMSO), and tetramethyl urea (TMU). In one embodiment, the preferred solvent is dimethylacetamide (DMAc).

Co-solvents can also be used generally at about five to 50 weight percent of the total solvent. Useful co-solvents include xylene, toluene, benzene, diethyleneglycol diethyl ether, 1,2-dimethoxyethane (monoglyme), diethylene glycol dimethyl ether (diglyme), 1,2-to-(2-methoxyethoxy)ethane (triglyme), to [2-(2-methoxyethoxy)ethyl)]ether (tetraglyme), to-(2-methoxyethyl)ether, tetrahydrofuran, "CelloSolve™" (glycol ethyl ether) and "Cellosolve™ acetate" (hydroxyethyl acetate glycol monoacetate).

The corona resistant polyimide films in accordance with the present invention can be produced by combining diamine and dianhydride monomers together, in the presence of a polar aprotic solvent, to form a polyamic acid solution (also called a polyamide acid solution). The dianhydride and diamine monomers are typically combined in a molar ratio of aromatic dianhydride monomer to aromatic diamine monomer of from about 0.90 to 1.10. Molecular weight of the polyamic acid can be adjusted by adjusting the molar ratio of the dianhydride and diamine monomers.

In one embodiment, the polyamic acid solution contains polyamic acid dissolved in a polar aprotic solvent at a concentration in a range between (and including) any two of the following percentages: 5,10, 12, 15, 20, 25, 27, 30, 40, 45, 50, 55, or 60(%). percent by weight. In one embodiment, the solvent content of the polyamic acid solution is in a range of from about 10, 12, 14, 16, 18, 20, or 22, to about 24, 26, 28 or 30 weight (%) percent solvent.

In one embodiment, nano-sized composite filler in accordance with the present invention (i.e., alumina oxide particles comprising $C_2$-$C_{12}$ alkyl organic component linked to the alumina via an organo siloxane linkage) are first dispersed in a solvent to form a slurry and then the slurry is dispersed in the polyamic acid precursor solution. The mixture is called a filled polyamic acid casting solution. The concentration of composite filler to polyimide (in the final film) is typically in the range of 5, 10, 15, 20, 25, 30, 35, or 40, to about 45, 50, 55, 60, 65 or 70(%) percent by weight. As the concentration of the composite filler increases, the corona resistance of the composite polyimide also increases.

The filled polyamic acid casting solution is typically a blend of a pre-formed polyamic acid solution and composite filler to form a slurry, where in at least one embodiment, the composite filler is present in a concentration range from about 1, 3, 5, 7, 9 or 10 weight (%) percent to about 15, 20, 25, 30, 35, 40, 45 or 50(%) weight percent. In one embodiment, the composite filler is first dispersed in the same polar aprotic solvent used to make the polyamic acid solution (e.g. DMAc). Optionally, a small amount of polyamic acid solution may be added to the composite filler slurry to either increase the viscosity of the slurry, or stabilize the slurry from unwanted particles agglomeration.

In one embodiment, a composite filler slurry is blended with a polyamic acid solution to form the filled polyamic acid casting solution. This blending operation can include high sheer mixing. Preferably, the average particle size of the composite filler in the slurry and the casting solution and final polyimide film is in a range between and including any two of the following sizes: 5, 10, 15, 20, 25, 30, 35, 40, 45, 50, 55, 60, 65, 70, 75, 80, 85, 90, 95, 100, 125, 150, 175, 200, 250, 300, 350, 400, 450, and 500 nanometers. In one embodiment, the average particle size is from 100 to 300 nanometers.

The ratio of polyamic acid to composite filler may be represented by the ratio A:B wherein A is the weight of the polyamic acid polymer and B is the weight of the composite filler. In one embodiment, A is a range between and including any two of the following: 0.1, 0.2, 0.3, 0.4, 0.5, 0.6, 0.7, 0.8, and 0.9 and B is 1. In this embodiment, if A is below 0.1, the films formed will generally be too brittle and may not be sufficiently flexible to form a freestanding, mechanically tough, flexible sheet that can be wrapped upon a conductive wire. Also in this embodiment, if A is above 0.9, the films formed therefrom may not be sufficiently corona resistant.

The polyamic acid casting solution mentioned above can optionally further comprise additional additives, including processing aids (e.g., oligomers), antioxidants, light stabilizers, flame retardant additives, anti-static agents, heat stabilizers, ultraviolet absorbing agents, inorganic fillers or various reinforcing agents. Common inorganic fillers include thermally conductive fillers, like granular metal oxides, and electrically conductive fillers like metals and electrically conductive polymers. Other common inorganic fillers include granular alumina, granular silica, fumed silica, silicon carbide, diamond, clay, boron nitride, aluminum nitride, titanium dioxide, dicalcium phosphate, and fumed metal oxides. Common organic fillers include polyaniline, polythiophene, polypyrrole, polyphenylenevinylene, polydialkylfluorenes, carbon black, and graphite.

In one embodiment, the polyamic acid casting solution is cast, or applied onto, a support such as an endless belt or rotating drum. A wet film then formed by heating the solution to remove some of the solvent. The wet film, sometimes called a 'green' film is converted into a self-supporting film by baking at an appropriate temperature where the solids are from 60, 65, 70, 75, 80, 85, and 90 weight percent. The green film is separated from the support, molecularly oriented tentering with continued thermal and radiation curing, to provide a fully cured polyimide film having a weight percent solids above 98.5%.

Other useful methods for producing polyimide films in accordance with the present invention can be found in U.S. Pat. Nos. 5,166,308 and 5,298,331 and are incorporated by reference into this specification for all teachings therein. Numerous variations are also possible such as:

(a) A method wherein the diamine monomers and dianhydride monomers are preliminarily mixed together and then the mixture is added in portions to a solvent while stirring.

(b) A method wherein a solvent is added to a stirring mixture of diamine and dianhydride monomers (contrary to (a) above).

(c) A method wherein diamines are exclusively dissolved in a solvent and then dianhydrides are added thereto at such a ratio as allowing to control the reaction rate.

(d) A method wherein the dianhydride monomers are exclusively dissolved in a solvent and then amine components are added thereto at such a ratio to allow control of the reaction rate.

(e) A method wherein the diamine monomers and the dianhydride monomers are separately dissolved in solvents and then these solutions are mixed in a reactor.

(f) A method wherein the polyamic acid with excessive amine component and another polyamic acid with excessive anhydride component are preliminarily formed and then reacted with each other in a reactor, particularly in such a way as to create a non-random or block copolymer.

(g) A method wherein a specific portion of the amine components and dianhydride components are first reacted and then residual dianhydride monomer is reacted, or vice versa.

(h) A method wherein the silane coated fumed alumina oxide particles are dispersed in a solvent and then injected into a stream of polyamic acid to form a filled polyamic acid casting solution and then cast to form a green film.

(i) A method wherein the components are added in part or in whole in any order to either part or whole of the solvent, also where part or all of any component can be added as a solution in part or all of the solvent.

(j) A method of first reacting one of the dianhydride monomers with one of the diamine monomers giving a first polyamic acid, then reacting the other dianhydride monomer with the other amine component to give a second polyamic acid, and then combining the amic acids in any one of a number of ways prior to film formation.

It is preferable to use a heating system having a plurality of heating sections or zones. It is also generally preferable that the maximum heating temperature be controlled to give a maximum air (or nitrogen) temperature of the ovens from about 200 to 600° C., more preferably from 350 to 500° C. By regulating the maximum curing temperature of the green film within the range as defined above, it is possible to obtain a polyimide film that has excellent mechanical strength, adhesive character, and thermal dimensional stability.

Alternatively, heating temperatures can be set to 200-600° C. while varying the heating time. Regarding the curing time, it is preferable that the polyimide films of the present invention be exposed to the maximum heating temperature for about 1, 2, 3, 5, 10, 15, 20, 25, 30, 35, 40, 45 or 50 seconds to about 60, 70, 80, 90, 100, 200, 400, 500, 700, 800, 900, 1000, 1100 or 1200 seconds. The heating temperature may be changed stepwise so as not to wrinkle the film by drying to quickly.

The thickness of the polyimide film may be adjusted depending on the intended purpose of the film or final application specifications. Depending upon the design criteria of any particular embodiment chosen, the film thickness can be in a range between (and including) any two of the following film thicknesses: 8, 10, 15, 20, 25, 30, 35, 40, 45, 50, 60, 80, 100, 125, 150, 175, 200, 300, 400 and 500 microns. In one embodiment, the thickness is from about 12 to about 125 microns and is preferably from 25 to 75 microns.

As used herein, the term 'corona resistant' means a material possessing the physical property of being able to withstand a prolonged electrical plasma attack for a specific period. In the case of a film, corona resistance is typically measured using a film sample of film that is about one thousands of an inch thick (~1.0 mil) or 25 microns. If the 1 mil (25 micron) film is capable of withstanding 750 volts of electricity (applied to the film using a copper probe measuring ¼" in diameter) at 1050 Hz for a period of greater than 200 hours, the film is said to be 'corona resistant.' In one embodiment, the polyimide films of the present invention survived over 1000 hours of corona testing.

As used herein, the term 'dielectric strength' is a term used to describe the amount of voltage a material can withstand in short instance of time. Dielectric strength of one-mil thick, conventional, unfilled (non-corona resistant) polyimide film is typically about 7,800 volts/mil. Conventional corona resistant films generally provide a dielectric strength of about 7,400 volts/mil. In one embodiment, one class of films according to the present invention are defined as having a dielectric strength greater than 7400, 7500, 7600, 7700, 7800, 7900, or 8000 volts/mil.

As used herein, the term 'elongation' is used to describe a film's ability to stretch under physical pulling force without breaking. In an elongation test, a film sample is placed between two holding clamps. The clamps are pulled in opposite directions. The distance the clamps are able to travel before the material breaks determines the amount of mechanical elongation present in the film. A higher elongation in a film allows the film to wrap more easily around an electrical wire in an electrical insulation application. Typical one-mil thick polyimide generally has an elongation of about 90 to 100 percent (%). Typical corona resistant polyimide films, like DuPont KAPTON CR®, generally have a mechanical elongation of about 40-60 percent (%). In one embodiment, one class of corona resistant films according to the present invention have a mechanical elongation of greater than 60, 65 or 70 percent.

In accordance with the present invention, the corona-resistant films herein are used to wrap, or coat, electrical conductors or conductor wires. These films are also used to impregnate laminated electrical insulation, thus providing superior electrical insulating systems. Additionally, multiple strands of conductive wires wrapped with such corona resistant films are wound together to form turns and coils. In these applications and depending upon the particular embodiment selected, corona resistance can be at least 10 times greater than the conventional insulation used for this purpose. Still further, such novel coils have special utility in the construction of transformers and dynamoelectric machine rotor/stators.

EXAMPLES

In order to prepare the aluminum oxide, a volatile aluminum compound is sprayed through a nozzle into a detonating gas made up of hydrogen and air. In most cases, aluminum trichloride is used. This substance undergoes hydrolysis, under the influence of the water formed during the detonating gas reaction, to give aluminum oxide and hydrochloric acid. After leaving the flame, the aluminum oxide enters a so-called coagulation zone, in which the aluminum oxide primary particles and primary aggregate agglomerate. The product, which is present in this stage as a kind of aerosol, is separated in cyclones from the gaseous accompanying substances and afterwards treated with moist hot air.

The particle size of the aluminum oxides can be varied by means of the reaction conditions, such as, for example, flame temperature, hydrogen or oxygen proportion, aluminum trichloride quantity, residence time in the flame, or length of the coagulation zone.

Preparation of the Pyrogenically Prepared Aluminum Oxide I

In a burner of known design, 320 kg/h of aluminum trichloride ($AICS_3$), which has been vaporized beforehand, is combusted together with 100 $Nm^3$/h of hydrogen and 450 $Nm^3$/h of air.

The finely divided, high surface area, pyrogenically prepared aluminum oxide is separated after the flame reaction from the simultaneously formed hydrochloric acid gases in a filter or cyclone; subsequently, traces of HCl that still adhere are removed by treatment with moistened air at elevated temperature.

The high surface area, pyrogenically prepared aluminum oxide I that forms has the physical-chemical characteristic data shown in Table I. In Table 1, for comparison, the data of commercially available, pyrogenic aluminum oxide of the company Degussa AG/Frankfurt is included. (Trade name Aluminiumoxid C[Aluminum Oxide C])

TABLE 1

|  | Unit | High surface area aluminum oxide | Aluminum oxide C |
|---|---|---|---|
| BET specific surface area | $m^2$/g | 121 | 100 |
| pH | 4% aqueous dispersion | 4.9 | 4.5 |
| Drying loss | Weight % | 3.3 | 3.0 |
| Bulk density | g/L | 55 | 48 |
| Tamped density | g/L | 63 | 57 |

As pyrogenically prepared aluminum oxide II, an aluminum oxide with the following physical-chemical characteristic data is employed. It is known from the Schriftenreihe Pigmente Nr. 56 "Hochdispergierte Metalloxide nach dem Aerosilverfahren" [Document Series Pigments No. 56 "Highly Disperse Metal Oxides via the Aerosil Process", 4th edition, February 1989, Degussa AG.

TABLE 2

|  | Aluminum oxide C |
|---|---|
| CAS Reg. Number | 1344-28-1 |
| Surface area in accordance with BET [1]) $m^2$/g | 100 ± 15 |
| Mean size of the primary particles nm | 13 |

TABLE 2-continued

|  | Aluminum oxide C |
|---|---|
| Tamped density $^{2)}$ g/L | approx. 80 |
| Specific gravity $^{10)}$ g/mL | approx. 3.2 |
| Drying loss $^{3)}$ on leaving the supplier % (2 hours at 105 C.) | <5 |
| Loss on ignition $^{4)}$ $^{7)}$ (2 hours at 1000 C.) % | <3 |
| pH value $^{5)}$ (in 4% aqueous dispersion) | 4.5-5.5 |
| $SiO_2$ $^{8)}$ | <0.1 |
| $Al_2O_3$ $^{8)}$ | <99.6 |
| $Fe_2O_3$ $^{8)}$ | <0.2 |
| $TiO_2$ $^{8)}$ | >0.1 |
| $ZrO_2$ $^{8)}$ | — |
| $HfO_2$ $^{8)}$ | — |
| HCl $^{8)}$ $^{9)}$ | <0.5 |
| Sieve residue $^{6)}$ (in accordance with Mocker, 45 m) % | <0.05 |

$^{1)}$ In accordance with DIN 66131
$^{2)}$ In accordance with DIN ISO 787/XI, JIS K 5101/18 (not sieved)
$^{3)}$ In accordance with DIN ISO 787/II, ASTM D 280, JIS K 5101/21
$^{4)}$ In accordance with DIN 55921, ASTM D 1208, JIS K 5101/23
$^{5)}$ In accordance with DIN ISO 787/IX; ASTM D !"=(; JIS K 5101/24
$^{6)}$ In accordance with DIN ISO 787/XVIII; JIS K 5101/20
$^{7)}$ Relative to substance dried for 2 hours at 105 C.
$^{8)}$ Relative to substance heated red hot for 2 hours at 1000 C.
$^{9)}$ HCl content is a component of the loss on ignition
$^{10)}$ Determined with the air reference pycnometer Determination of the Physical-Chemical Characteristic Data BET Surface Area The BET surface area is determined in accordance with DIN 66 131 with nitrogen.

Tamped Density

Determination of the tamped density in adaptation of DIN ISO 787/XI

Fundamentals of the Tamped Density Determination

The tamped density (formerly the tamped volume) is equal to the quotient of the mass and the volume of a powder after tamping in the tamping volumeter under predetermined conditions. In accordance with DIN ISO 787/XI, the tamped density is given in g/cm³. Because of the very low tamped density of the oxides, however, the value is given in g/L by us. Furthermore, the drying and sieving as well as the repetition of the tamping operation is dispensed with.

Apparatus for Tamped Density Determination

Tamping volumeter

Volumetric cylinder

Laboratory scale (Reading to 0.01 g)

Carrying Out the Tamped Density Determination

200±10 mL of oxide is filled into the volumetric cylinder of the tamping volumeter in such a way that no pores remain and the surface is level. The mass of the filled sample is determined precisely to 0.01 g. The volumetric cylinder with the sample is placed in the volumetric cylinder holder of the tamping volumeter and tamped 1250 times. The volume of the tamped oxide is read off 1 time exactly.

Evaluation of the Tamped Density Determination $$\text{Tamped density (g/L)} = \frac{\text{g weighed quantity} \times 1000}{\text{mL volume read off}}$$

pH Value

The pH value is determined in 4% aqueous dispersion for hydrophobic oxides in Water:methanol 1:1.

Reagents for the pH Value Determination

Distilled or completely deionized water, pH>5.5

Methanol, p.a.

Buffer solutions pH 7.00 pH 4.66

Apparatus for pH Value Determination

Laboratory scale, (Reading to 0.1 g)

Glass beaker, 250 mL

Magnetic stirrer

Magnetic rod, length 4 cm

Combined pH electrodes pH measuring apparatus

Dispensers, 100 mL

Working Procedure for the Determination of the pH Value

The determination is conducted in adaptation of DIN/ISO 787/IX:

Calibration: Prior to the pH value determination, the measuring apparatus is calibrated with the buffer solutions. If several measurements are carried out in succession, a single calibration suffices.

4 g of hydrophilic oxide is stirred into a paste in a 250 mL glass beaker with 96 g (96 mL) of water by use of a dispenser and stirred for five minutes with a magnetic stirrer while the pH electrode is immersed (rpm approx. 1000 min$^{-1}$).

4 g of hydrophobic oxide is stirred into a paste in a 250 mL glass beaker with 48 g (61 mL) of methanol and the suspension is diluted with 48 g (48 mL) of water and stirred for five minutes with a magnetic stirrer while the pH electrode is immersed (rpm approx. 1000 min$^{-1}$). After the stirrer has been switched off, the pH is read off after a standing time of one minute. The result is given to within one decimal place.

Drying Loss

In contrast to the weighed quantity of 10 g mentioned in DIN ISO 787 II, a weighed quantity of 1 g is used for the drying loss determination.

The cover is put in place prior to cooling. A second drying is not conducted.

Approx. 1 g of the sample is weighed precisely to 0.1 mg into a weighing dish with a ground cover that has been dried at 105° C., the formation of dust being avoided, and dried for two hours in the drying cabinet at 105° C. After cooling in a desiccator with its cover still on, the sample is reweighed under blue gel.

$$\% \text{ Drying loss at } 105° \text{ C.} = \frac{\text{g weight loss}}{\text{g weighed quantity}} \times 100$$

The result is given to within one decimal place.

Loss on Ignition

Apparatus for the Determination of the Loss on Ignition

Porcelain crucible with crucible cover

Muffle furnace

Analysis scale (Reading to 0.1 mg)

Desiccator

Carrying Out the Loss on Ignition

In departure from DIN 55 921, 0.3-1 g of the undried substance is weighed to precisely 0.1 mg into a porcelain crucible with a crucible cover, which have been heated red hot beforehand, and heated red hot for 2 hours at 1000° C. in a muffle furnace.

The formation of dust is to be carefully avoided. It has proven advantageous to place the weighed samples into the muffle furnace while the latter are still cold. Slow heating of the furnace prevents the creation of stronger air turbulence in the porcelain crucible. After 1000° C. has been reached, red-hot heating is continued for a further 2 hours. Subsequently, a crucible cover is put in place and the weight loss of the crucible is determined in a desiccator over blue gel.

Evaluation of the Determination of the Loss on Ignition

Because the loss on ignition is determined relative to the sample dried for 2 h at 105° C., the following calculation formula results:

$$\% \text{ Loss on ignition} = \frac{m_0 \times \frac{100 - TV}{100} - m_1}{m_0 \times \frac{100 - TV}{100}} \times 100$$

$m_0$ = weighed quantity (g)

TV = drying loss (%)

$m_1$ = weight of the sample after being heated red hot (g)

The result is given to within one decimal place.

Preparation of the Products in Accordance with the Invention

The pyrogenically prepared aluminum oxides are placed in a mixer for surface modification and sprayed first with water and afterwards with the surface modifying agent. After the spraying has ended, mixing can be continued for an additional 15 to 30 min and tamping is subsequently carried out for 1 to 4 h. The water employed can be acidified with an acid—for example, hydrochloric acid—to give a pH value of 7 to 1. The surface modifying agent employed can be dissolve in a solvent, such as, for example, ethanol.

TABLE 3

Preparation of the surface modified, pyrogenically prepared aluminum oxides

| Example | Aluminum oxide | Surface modifying agent | Parts OM*/100 Parts oxide | Parts H$_2$O/100 Parts oxide | Temperature [° C.] | Tempering time [h] |
|---|---|---|---|---|---|---|
| 1 | I | A | 16 | — | 120 | 2 |
| 2 | I | B | 9.5 | — | 120 | 2 |
| 3 | I | C | 7.3 | — | 120 | 2 |
| 4 | I | D | 9.8 | — | 120 | 2 |
| 5 | I | F | 26 | — | 350 | 2 |
| 6 | I | G | 7.3 | — | 120 | 2 |
| 7 | II | G | 5.5 | — | 120 | 2 |
| 8 | II | D | 7.5 | — | 120 | 2 |
| 9 | II | F | 10 | — | 350 | 2 |
| 10 | II | C | 5.5 | — | 120 | 2 |
| 11 | II | C | 11 | — | 120 | 2 |
| 12 | II | A | 10 | — | 120 | 2 |
| 13 | II | B | 7 | — | 140 | 2 |
| 14 | II | A | 9 | 4 | 120 | 2 |
| 15 | II | A | 12 | 5** | 120 | 2 |
| 16 | II | H | 20 | — | 130 | 2 |
| 17 | II | E | 9 | 5 | 120 | 2 |

*Surface modifying agent
**In place of H$_2$O, 0.001 N HCl was employed.
Surface modifying agent:
A = Octyltrimethoxysilane
B = Hexamethyldisilazane
C = 3-Methacryloxypropyltrimethoxysilane
D = Hexadecytrimethoxysilane
E = aminopropyltrethoxysilane
F = Dimethylpolysilane
G = Glycidyloxypropyltrimethoxysilane

TABLE 4

Physical-chemical data of the surface modified, pyrogenically prepared aluminum oxides

| Sample | Specific surface area in accordance with BET [m$^2$/g] | Tamped density [g/L] | Drying loss [%] | Loss on ignition [%] | pH value | C content [%] |
|---|---|---|---|---|---|---|
| 1 | 119 | 56 | 0.9 | 9.6 | 3.9 | 6.0 |
| 2 | 121 | 48 | 1.0 | 3.7 | 7.0 | 1.6 |
| 3 | 120 | 45 | 1.0 | 6.1 | 4.6 | 2.5 |
| 4 | 114 | 49 | 1.2 | 9.4 | 5.0 | 5.1 |
| 5 | 107 | 58 | 0.3 | 2.9 | 4.0 | 2.4 |
| 6 | 126 | 43 | 1.1 | 6.4 | 5.8 | 2.3 |
| 7 | 98 | 45 | 1.0 | 4.6 | 4.9 | 1.7 |
| 8 | 91 | 49 | 1.4 | 6.7 | 4.0 | 4.0 |
| 9 | 83 | 54 | 0.1 | 1.4 | 3.9 | 1.3 |
| 10 | 96 | 43 | 0.3 | 5.8 | 3.9 | 1.9 |
| 11 | 93 | 49 | 0.3 | 7.7 | 3.6 | .4 |
| 12 | 98 | 45 | 0.6 | 6.3 | 3.7 | 4.0 |

TABLE 4-continued

Physical-chemical data of the surface modified, pyrogenically prepared aluminum oxides

| Sample | Specific surface area in accordance with BET [m²/g] | Tamped density [g/L] | Drying loss [%] | Loss on ignition[%] | pH value | C content [%] |
|---|---|---|---|---|---|---|
| 13 | 90 | 38 | 0.1 | 3.7 | 4.9 | 0.9 |
| 14 | 95 | 49 | 0.4 | 5.8 | 3.6 | 3.4 |
| 15 | 92 | 47 | 0.6 | 6.8 | 3.2 | 4.4 |
| 16 | 90 | 56 | 1.3 | 14.8 | 3.6 | 3.1 |
| 17 | 104 | 44 | 2.2 | 4.6 | 7.7 | 1.6 |

Example 18

Silane coated fumed alumina oxide particles according to example 12 were dispersed in a polyimide film. A 19 solids weight (%) percent solution of a polyamic acid derived from pyromellitic acid (PMDA) and 4,4'-oxydianiline (4,4'-ODA) was prepared. The viscosity of the polyamic acid was about 1,000 poise at approximately 98% stoichiometry. The polyamic acid was then degassed and allowed to equilibrate for 24 hours.

Silane coated fumed alumina oxide according to example 12, made using a vapor coating process, was added to DMAc to form a 10% by weight slurry. The slurry was sheared using a low shearing force for approximately 5 minutes to disperse the particles. The silane surface coated alumina slurry was then added to the degassed polyamic a cid solution until a 15% by weight concentration of alumina to polymer was achieved. The viscosity of the mixture was adjusted by adding more dianhydride so that the viscosity was about 1000 poise.

Next, the polyamic acid and alumina mixtures were poured onto a glass plate and dried in a hot oven where the temperature was ramped from 60° C. to 150° C. over 15 minutes. A 70 weight % solids semi-cured green film was produced. The semi-cured film was then cured for 3 minutes in a 300° C. oven to obtain a ~1 mil thick polyimide film having about 99.5% solids. The sample was then tested on a Hypotronics ramping voltage dielectric tester. The average of 20 dielectric tests is listed as EXAMPLE 1 in the Table 5 below.

Comparative Example 1

Polyimide films were produced starting with a 19 solids weight (%) percent solution of a polyamic acid derived from pyromellitic acid (PMDA) and 4,4'-oxydianiline (4,4'-ODA). The viscosity of the polyamic acid was about 1,000 poise at approximately 98% stoichiometry. The polyamic acid was then degassed and allowed to equilibrate for 24 hours.

Next, the polyamic acid was poured onto a glass plate and dried in a temperature ramped oven from 60° C. to 150° C. over 15 minutes to obtain a 70 weight % solids semi-cured green film. The semi-cured film was then cured for 3 minutes in a 300° C. oven to obtain a 1 mil thick polyimide film having about 99.5% solids. The sample was then tested on a Hypotronics ramping voltage dielectric tester. The average of 20 dielectric tests is listed as COMPARATIVE EXAMPLE 1 in Table 5 below.

TABLE 5

| Film Sample | Dielectric Value | Comments |
|---|---|---|
| EXAMPLE 1 - a 1 mil silane coated fumed alumina polyimide film | 5843 Volts/mil | Treated silane coated fumed alumina has higher dielectric strength than pure polyimide |
| COMPARATIVE EXAMPLE 1 - a 1 mil pure polyimide film containing no electrically conductive filler | 5684 Volts/mil | Pure polyimide standard sample, a blank. |

Example 19

A polyimide film was produced using a commercial scale manufacturing line. The polyimide was made using a 19 percent by weight solution of polyamic acid derived from PMDA and 4,4'-ODA. The viscosity of the polyamic acid was about 1,500 poise and the stoichiometry of the polymer was about 98%. A 10% by weight slurry of low sheared, silane coated fumed alumina oxide was added to the polyamic acid. The mixture was sheared to substantial homogeneity and additional dianhydride was added to increase the viscosity of the mixture to about 1500 poise.

The polyamic acid, silane coated fumed alumina oxide mixture was cast onto a belt and thermally cured to about 70% solids by weight. The wet film was cured in a tenter oven at 400° C. to about 99.5% solids by weight. The polyamic acid was converted to a polyimide. The polyimide film was tested on the Hypotronics ramping voltage dielectric tester. The average dielectric strength of about 100 tests is listed in Table 2 below. The mechanical properties of the film are shown in Table 3 below.

Comparative Example 2

A polyimide film was produced using a commercial scale manufacturing line. The polyimide was made using a 19 percent by weight solution of polyamic acid derived from PMDA and 4,4'-ODA. The viscosity of the polyamic acid was about 1,500 poise and the stoichiometry of the polymer was about 98%. The polyamic acid was cast onto a belt and thermally cured to about 70% solids by weight. The wet film was cured in a tenter oven at 400° C. to about 99.5% solids by weight where the polyamic acid was converted to a polyimide. The polyimide film was tested on the Hypotronics ramping voltage dielectric tester. The average dielectric strength of about 100 tests is listed in Table 6 below. The mechanical properties of the film are shown in Table 7 below.

Comparative Example 3

A polyimide film was produced using a commercial scale manufacturing line. The polyimide was made using a 19% by weight solution of polyamic acid derived from PMDA and 4,4'-ODA. The viscosity of the polyamic acid was about 1,500 poise and the stoichiometry of the polymer was about 98%. A 10% by weight slurry of highly sheared, non-surface treated fumed alumina oxide was added to the polyamic acid at the same quantities and concentration as EXAMPLE 2. The mixture was sheared to substantial homogeneity and additional dianhydride was added to increase the viscosity of the mixture to about 1500 poise.

The polyamic acid, non-surface treated fumed alumina oxide mixture was cast onto a belt and thermally cured to about 70% solids by weight. The wet film was cured in a tenter oven at 400° C. to about 99.5% solids by weight. The polyamic acid was converted to a polyimide. The polyimide film was tested on the Hypotronics ramping voltage dielectric tester. The average dielectric strength of about 100 tests is listed in Table 2 below. The mechanical properties of the film are shown in Table 3 below.

TABLE 6

| Film Sample | Dielectric Value | Comments |
| --- | --- | --- |
| Silane Coated Fumed Alumina Oxide according to example 12 and Polyimide Composite film made on Commercial Scale manufacturing Line | 7,954 Volts/mil | 1 ml thick film shows that silane coated fumed metal oxide improves the Dielectric Strength of Polyimide |
| Commercial Polyimide, KAPTON HA ® film with no filler added | 7,788 Volts/mil | 1 mil thick Standard Polyimide |
| Commercial Polyimide, KAPTON CR ® made using non-surface treated Fumed Alumina Oxide particles 1 mil Film | 7,365 Volts/mil | 1 mil thick Standard Corona Resistant polyimide film |

TABLE 7

| Film Sample | Elongation/ Modulus (MD) | Comments |
| --- | --- | --- |
| Silane Coated Fumed Alumina Oxide according to example 12 and Polyimide Composite film made on Commercial Scale manufacturing Line | 76.4/345 | Higher elongation of new corona resistant film will allow film to be wrapped over wire without breaking. |
| Commercial Polyimide, KAPTON HA ® film with no filler added | 50/400 | Low elongation film difficult to pull around wires and will break if stretched too far. |
| Commercial Polyimide, KAPTON CR ® made using non-surface treated Fumed Alumina Oxide particles 1 mil Film | 90/320 | Standard polyimide showing high elongation excellent for wire wrap, no corona resist applications. |

We claim:

1. A product consisting of a pyrogenically prepared, surface modified aluminum oxide modified by a surface modifying agent selected from the group consisting of octyltrimethoxysilane and octyltriethoxysilane, and having the following physical chemical properties:

| | |
| --- | --- |
| Surface area [m$^2$/g] | 50 to 150 |
| Tamped density [g/L] | 25 to 130 |
| Drying loss [%] | less than 5 |
| Loss on ignition [%] | 0.1 to 15 |
| C content [%] | 0.1 to 15 |
| pH value | 3 to 9. |

2. A corona resistant polymer composition comprising a filled thermosetting or thermoplastic polymer having dispersed within said polymer as a filler an additive consisting of the product according to claim 1.

3. The corona resistant polymer composition according to claim 2 wherein the polymer is a polyimide.

4. A shaped article made from the polymer composition according to claim 2.

5. A process for the preparation of the product in accordance with claim 1, comprising spraying the pyrogenically prepared aluminum oxide with the surface modifying agent at room temperature to form a mixture and subsequently thermally treating the mixture at a temperature of 50 to 400° C. over a period of 1 to 6 h.

6. A process for the preparation of the product in accordance with claim 1, comprising spraying the pyrogenically prepared aluminum oxide with the surface modifying agent in vapor form and to form a mixture subsequently thermally treating the mixture at a temperature of 50 to 800° C. over a period of 0.5 to 6 h.

* * * * *